United States Patent

[11] 3,599,141

| [72] | Inventors | Bradrick A. Hildreth<br>Huntington Beach;<br>Robert D. Hill, Jr., West Covina, both of, Calif. |
|---|---|---|
| [21] | Appl. No. | 839,348 |
| [22] | Filed | July 7, 1969 |
| [45] | Patented | Aug. 10, 1971 |
| [73] | Assignee | Spectrol Electronics Corporation<br>City of Industry, Calif. |

[54] VARIABLE RESISTOR HAVING MEANS FOR SEALING BETWEEN A LEAD SCREW AND THE HOUSING
5 Claims, 2 Drawing Figs.

[52] U.S. Cl. .................................................... 338/180, 338/164, 338/183
[51] Int. Cl. .................................................... H01c 9/02
[50] Field of Search .......................................... 338/118, 160, 176, 180, 164, 183, 184, DIG. 1

[56] References Cited
UNITED STATES PATENTS

| 3,187,289 | 6/1965 | Rowles | 338/180 |
| 2,953,763 | 9/1960 | Bourns | 338/183 |
| 3,488,618 | 1/1970 | Yungblut | 338/184 X |

Primary Examiner—Lewis H. Myers
Assistant Examiner—Gerald P. Tolin
Attorneys—Harry G. Martin, Jr. and J. Raymond Curtin ABSTRACT: A potentiometer having a closed casing in which is disposed a resistance element, a wiper element, and a helically threaded, axially extending lead screw member. A plurality of frustoconical, radially extending, integral, resilient plastic sealing ribs are provided about a reduced diameter portion of the lead screw. A cylindrical aperture is formed in one end wall of the housing having a cylindrical interior surface against which the annular sealing ribs are resiliently engaged and deformed for inhibiting the entrance of foreign matter into the housing.

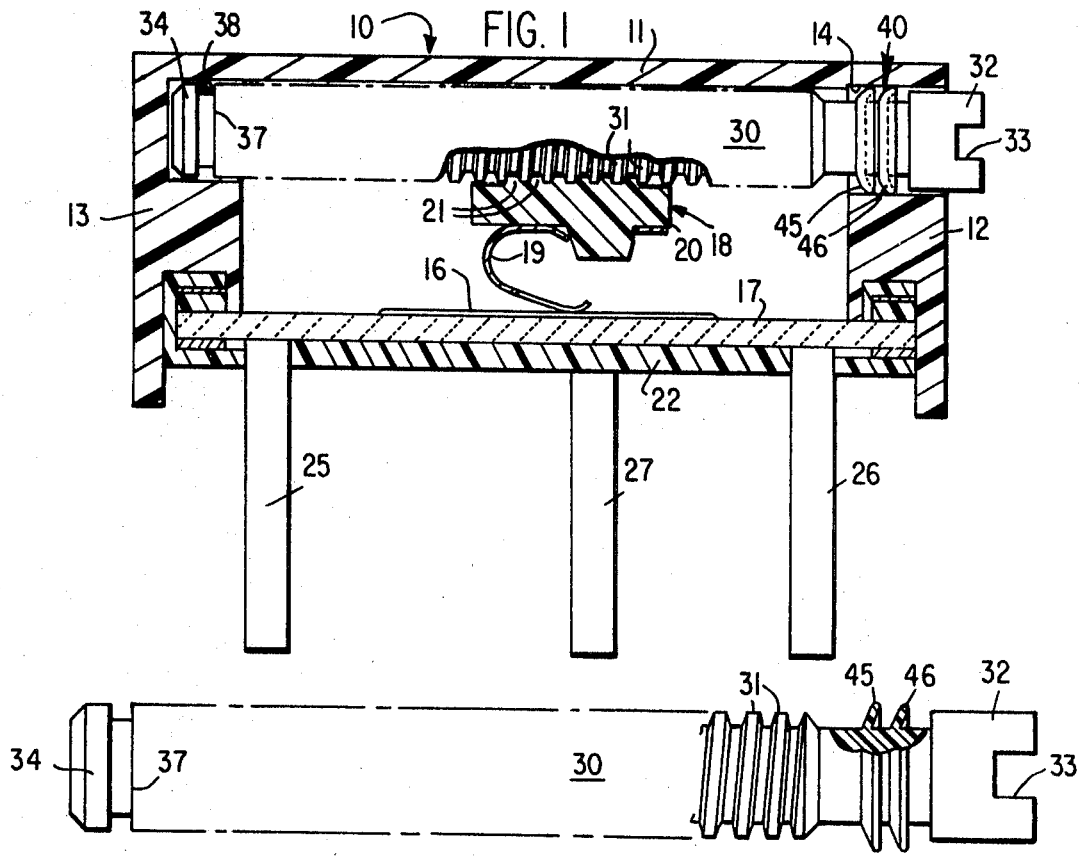

VARIABLE RESISTOR HAVING MEANS FOR SEALING BETWEEN A LEAD SCREW AND THE HOUSING

BACKGROUND OF THE INVENTION

This invention relates to variable resistors, and more particularly to variable resistors having lead screws which are sealed to the housing of the resistor while permitting rotational movement of the lead screw from the exterior of the housing.

Variable resistors which are contained in sealed housings require some means for external manipulation of the internal wiper element. One common external manipulation means comprises an axially extending lead screw disposed in an aperture in an end wall of the resistor housing. It is customary to provide some type of sealing means to inhibit the entrance of foreign matter, such as moisture and dirt, into the variable resistor housing at the point from which the lead screw emerges. Such means customarily take the form of an O-ring disposed between radially extending flanges in the lead screw and pressed into engagement with a cylindrical aperture in the housing of the variable resistor. While this arrangement is capable of providing satisfactory results for most purposes, the assembly of the O-ring on the lead screw is an operation which is performed by hand and would be desirable to eliminate the cost and complexity of assembling a separate O-ring, if possible. Furthermore, the O-ring may be subject to deterioration when exposed to certain lubricants or from age and is easily sheared or otherwise broken during assembly which may result in an unsatisfactory seal during the otherwise useful life of the variable resistor. Further, the use of an O-ring results in two rubbing or sealing contact surfaces, one between the ring and the lead screw and the other between the ring and the housing, at which failure of the seal may occur.

According, it is a principal feature of this invention to provide an improved, reliable sealing means for the lead screw of a variable resistor which eliminates the necessity of a separate assembly step for a sealing device.

SUMMARY OF THE INVENTION

A sealed potentiometer housing member containing a resistance and wiper element is provided with a cylindrical aperture extending through one of two spaced, axial end walls of the housing. A helically threaded, axially extending, lead screw member is positioned in the housing and extends into the cylindrical aperture. One or more annular sealing ribs are integrally formed on one of the members and are of a size so that they tightly engage the interior surface of the cylindrical aperture in the housing member to form a bearing and seal therewith.

DESCRIPTION OF THE DRAWINGS

FIG. 1 is a cross-sectional view through a variable resistor in accordance with this invention; and FIG. 2 is a plan view, partly in phantom, of an improved lead screw shown in FIG. 1.

DESCRIPTION OF A PREFERRED EMBODIMENT

A variable resistor 10, such as a potentiometer, is provided with a generally sealed housing member 11 having one axial end wall 12 spaced from another axial end wall 13. A cylindrical aperture 14 having a smooth interior cylindrical surface extends completely through one end wall 12. A suitable resistance element 16 and a parallel collector track (not shown) formed on a suitable substrate 17 forms a cover member for closing housing 11. Cover member 17 is preferably sealed to housing member 11 by means of epoxy resin or other suitable potting agent 22.

A wiper element 18 is disposed within housing 11 for engagement with resistance element 16. Wiper element 18 comprises a wiper contact 19 of an electrically conductive metal secured to a half nut 20 having threads 21 formed thereon. As shown in the drawing, half nut 18 is biases into engagement with lead screw 30 by contact member 19. Terminals 25 and 26 extend from housing 11 for making external electrical connection to the terminations of resistance element 16. Terminal 27 similarly extends from housing 11 and makes electrical connection with the collector track which in turn is connected by wiper contact 19 to the desired resistance point on resistance element 16.

An axially extending lead screw member 30 is positioned within housing member 11 for adjusting and setting the position of wiper element 18 with respect to resistance element 16. Lead screw 30 has helical threads 31 formed thereon which engage threads 21 on wiper element 18. One end 32 of lead screw 30 is provided with a screwdriver slot 33 or other manipulating means for rotating lead screw from outside casing 11. The other end 34 of lead screw 30 is provided with a cylindrical groove 37 in which a transverse retaining pin 38 is inserted after assembly of the lead screw in the housing to resist withdrawal of the lead screw therefrom. Other lead screw locating or retaining means may be alternately employed to locate and support other end 34 of lead screw 30 or to prevent the lead screw from being unintentionally withdrawn from the housing.

A sealing arrangement 40 is provided adjacent to and spaced from one end 32 of lead screw 30. As best shown in FIG. 2, the preferred sealing arrangement comprises a pair of radially and axially outwardly extending, integral, frustoconical sealing ribs 45 and 46. Housing 11 is preferably made of a rigid plastic material, such as dialtylphthalate. Lead screw 30 is preferably made of a resilient plastic material, such as nylon, which imparts resiliency to annular sealing ribs 45 and 46. The radially outer ends of the sealing ribs are preferably rounded so that they provide substantially line contact with the smooth interior surface of cylindrical aperture 14 when the lead screw is inserted in place. When inserted, the annular sealing ribs 45 and 46 are elastically deformed slightly radially inwardly and press outwardly against cylindrical surface 14 because of their own resilience to form both a bearing surface for rotatably journaling lead screw 30 and for inhibiting the entrance of foreign particles into housing 11. The material of housing 11 may also be sufficiently resilient to elastically deform and provide a seal with sealing ribs 45, 46.

While any number of annular sealing ribs may be employed, it is preferred to employ two or more such ribs so as to have a staged labyrinth sealing effect. The employment of two or more sealing ribs also provides added assurance in the event that one of the ribs might become damaged, and a pair of ribs also provides a superior bearing. A suitable lubricant, such as silicon grease, may be packed in the space between the sealing ribs in order to reduce friction and enhance the sealing action, if desired.

Other modifications of this invention may be made such as providing the annular sealing ribs on the housing member in frictional engagement with a smooth cylindrical surface on the lead screw, if desired. However, for simplicity in manufacture, it is preferred to form the sealing ribs integral with the lead screw. Likewise either the housing member or the lead screw member may have ribs integral therewith which are more or less rigid than the other member to provide greater deformation of either desired member. Similarly, the sealing ribs could slant axially inward toward the housing, if desired, although the outward orientation shown in the drawings is preferred to simplify assembly and to resist withdrawal.

It will be apparent that the preferred arrangement described possesses the advantage of being extremely simple to manufacture by conventional plastic molding techniques and/or machining while providing a reliable sealing and bearing for the lead screw. In the event that the variable resistor is exposed to substantial pressure difference between the exterior and interior thereof, the multiple annular sealing ribs provide a staged labyrinth pressure drop seal to accommodate the differential pressure without adversely affecting the sealing properties of the combined bearing and seal. Because the lead screw is of simple construction which does not require a separate bearing or seal for assembly therewith, the cost of a variable resistor in accordance with this invention is reduced and its assembly is simplified. Also, the described arrangement eliminates the dual parallel seal failure paths of an O-ring and provides a series of seals, any one of which is capable of protecting the resistor from the entrance of foreign material.

Accordingly, this invention may be otherwise embodied within the scope of the following claims.

We claim:

1. A variable resistor comprising:
   A. a closed housing member having a pair of axially spaced end walls, one of said end walls having a cylindrical aperture therein for receiving an adjusting screw;
   B. A resistance element and a cooperating resistance wiper element disposed within said housing, and terminal means for making electrical contact with said resistance element and said wiper element from the exterior of said housing;
   C. a helically threaded adjusting screw member, said adjusting screw member being axially disposed between said end walls and having an end disposed in the cylindrical aperture in said one axial end wall of said housing for manipulating the adjusting screw from outside said housing, the threads on said adjusting screw engaging and cooperating with said wiper element for axially moving and positioning said wiper at a desired resistance setting;
   wherein the improvement comprises:
   D. sealing means for sealing said adjusting screw to said housing to inhibit entrance of foreign material into said housing between said adjusting screw and said cylindrical aperture, said sealing means comprising a thin, circumferentially continuous, resilient, elastically deformed, annular, frustoconical, sealing rib of plastic material, said sealing rib being integral with one of said members, and tapering in a direction radially and axially away from said adjusting screw in a direction toward the end wall of said housing having said cylindrical aperture therein, the other of said members having a smooth cylindrical surface thereon and said sealing rib being deformed so as to resiliently and frictionally engage said smooth cylindrical surface on the other of said members in rotatable bearing engagement therewith whereby said sealing rib is urged by its own resiliency into line sealing and bearing contact with said cylindrical surface on the other of said members to form a seal and a rotatable bearing therebetween.

2. A variable resistor as defined in claim 1 wherein said variable resistor includes an axially spaced plurality of said sealing ribs disposed for sealing between said adjusting screw and said housing.

3. A variable resistor as defined in claim 1 including a plurality of said sealing ribs disposed in spaced relation along the axis of said adjusting screw and lubricant means packaged between said sealing ribs for sealing and lubricating the juncture of the adjusting screw with said housing.

4. A variable resistor as defined in claim 1 including retaining means disposed adjacent the other end of said adjusting screw for positively resisting withdrawal of said adjusting screw from said housing, said retaining means effecting cooperative engagement between said adjusting screw and said housing to form a bearing for the adjusting screw adjacent the other end thereof.

5. A variable resistor comprising:
   A. a closed housing member having a pair of axially spaced end walls, one of said end walls having a cylindrical aperture therein for receiving a lead screw, the other end of said housing having journal means associated therewith for retaining a lead screw in rotary engagement with said housing;
   B. a resistance element and a cooperating axially movable resistance wiper element disposed within said housing, and terminal means for making electrical contact with said resistance element and said wiper element from the exterior of said housing;
   C. a helically threaded lead screw member, said lead screw member being axially disposed between said end walls and having one end thereof disposed in the cylindrical aperture in said one axial end wall of said housing for manipulating the lead screw from outside said housing, the threads on said lead screw engaging and cooperating with said wiper element for axially moving and positioning said wiper at a desired resistance setting; the other end of said lead screw being rotatably engaged with said journal means associated with the other end of said housing;
   wherein the improvement comprises:
   D. sealing means for providing a seal between said lead screw and said housing, the cylindrical aperture in said housing having a smooth cylindrical inner wall surface, said sealing means comprising a plurality of radially extending, axially spaced, annular, circumferentially continuous, resilient sealing ribs disposed adjacent said one end of said lead screw, said sealing ribs being carried on and integral with said lead screw, said sealing ribs each having an unstressed frustoconical shape extending radially and axially outwardly from the axis of said lead screw toward said one end of said lead screw and having an unstressed exterior diameter greater than the interior diameter of said cylindrical aperture in said housing, said sealing ribs having a relatively thin axial thickness so as to promote resilient deformation of the ribs when inserted into said cylindrical aperture in said housing, said lead screw and said plurality of sealing ribs comprising a resilient plastic material, said sealing ribs being stressed by their own resiliency into frictional, rotatable engagement with the smooth cylindrical wall surface formed by said cylindrical aperture in the one end wall of said housing to make a corresponding plurality of substantially annular line sealing and bearing contacts therewith, thereby forming a bearing for rotatably journaling and supporting said lead screw in said cylindrical aperture while inhibiting the entrance of foreign material into said housing.